(12) United States Patent
Deng et al.

(10) Patent No.: US 9,592,802 B2
(45) Date of Patent: Mar. 14, 2017

(54) BRAKE-BY-WIRE SYSTEM BASED ON DUAL-MOTOR CONFIGURATION AND OPERATION METHODS THEREOF

(71) Applicant: Yangzhou Taibo Automotive Electronics Intelligent Technology Company, Ltd, Jiangsu, Yangzhou (CN)

(72) Inventors: Weiwen Deng, Irvine, CA (US); Nenggen Ding, Beijing (CN)

( * ) Notice: Subject to any disclaimer, the term of this patent is extended or adjusted under 35 U.S.C. 154(b) by 78 days.

(21) Appl. No.: 14/566,590

(22) Filed: Dec. 10, 2014

(65) Prior Publication Data

US 2016/0167632 A1   Jun. 16, 2016

(51) Int. Cl.
| | |
|---|---|
| B60T 8/42 | (2006.01) |
| B60T 8/172 | (2006.01) |
| B60T 7/04 | (2006.01) |
| B60T 8/40 | (2006.01) |
| B60T 13/14 | (2006.01) |
| B60T 13/66 | (2006.01) |
| B60T 13/68 | (2006.01) |
| B60T 13/74 | (2006.01) |
| B60T 8/50 | (2006.01) |

(52) U.S. Cl.
CPC ............. B60T 8/172 (2013.01); B60T 7/042 (2013.01); B60T 8/4081 (2013.01); B60T 8/4086 (2013.01); B60T 13/146 (2013.01); B60T 13/662 (2013.01); B60T 13/686 (2013.01); B60T 13/745 (2013.01); B60T 8/5012 (2013.01); B60T 2210/12 (2013.01); B60T 2270/404 (2013.01)

(58) Field of Classification Search
CPC . B60T 7/042; B60T 8/34; B60T 8/171; B60T 8/172; B60T 8/176; B60T 8/4081; B60T 8/4086
USPC ........... 303/9.75, 113.1, 113.2, 113.4, 115.2; 188/358–360
See application file for complete search history.

(56) References Cited

U.S. PATENT DOCUMENTS

| | | | | |
|---|---|---|---|---|
| 5,234,263 A | * | 8/1993 | Haerr ...................... | B60T 8/347 303/113.2 |
| 5,758,930 A | * | 6/1998 | Schiel ..................... | B60T 7/042 188/358 |
| 5,836,659 A | * | 11/1998 | Feigel ...................... | B60T 8/00 303/113.4 |
| 6,315,370 B1 | * | 11/2001 | Feigel ..................... | B60T 7/042 303/113.4 |

(Continued)

Primary Examiner — Christopher Schwartz
(74) Attorney, Agent, or Firm — William C. Lin, PLC

(57) ABSTRACT

A brake control system of a vehicle, including a first electric motor, a second electric motor, a first piston cylinder and a second piston cylinder. Each piston cylinder includes a hydraulic chamber and a piston, where the position of the piston defines the volume of the hydraulic chamber. The system includes a plurality of wheel cylinders and a hydraulic control unit which includes two sets of electromagnetic valves. Each of electric motors are mechanically connected to the piston of respective piston cylinder via a motion converter that converts rotational motion of the electric motor to linear motion of the piston, thus changing the pressure of the hydraulic chamber. The hydraulic chambers are hydraulically connected with the respective set of the electromagnetic valves, further connecting to corresponding wheel cylinders.

14 Claims, 13 Drawing Sheets

(56) References Cited

U.S. PATENT DOCUMENTS

| | | | |
|---|---|---|---|
| 2012/0112525 A1* | 5/2012 | Shimada | B60T 7/042 303/10 |
| 2013/0147259 A1* | 6/2013 | Linkenbach | B60T 7/042 303/14 |
| 2014/0225425 A1* | 8/2014 | Drumm | B60T 7/042 303/9.75 |

* cited by examiner

BRAKE-BY-WIRE SYSTEM BASED ON DUAL-MOTOR CONFIGURATION AND OPERATION METHODS THEREOF

FIELD

The present invention relates to vehicle brake system technology; and more particularly to a brake-by-wire system based on dual-motor configuration.

BACKGROUND

The background description provided herein is for the purpose of generally presenting the context of the disclosure. All description and statements in this background section, as well as aspects of the description that may not otherwise qualify as prior art at the time of filing, are neither expressly nor impliedly admitted as prior art against the present disclosure.

In automotive industry, the areas of major technology development nowadays include vehicle safety, energy saving and environmental friendliness, as well as intelligent electronics. Vehicle brake system is an inseparable part of vehicle safety, and has received high degree of attention. In the recent years, in addition to wide application of antilock brake system (ABS), stability enhancement system and brake assistance system (BA) in many lines of vehicle production, the adaptive cruise control (ACC) and active collision avoidance systems have also been applied to varieties of vehicle platforms, demanding an ever enhanced requirement of brake systems.

With technology advancement in electronic controls reaching an unprecedented level, by-wire control technology also enjoys the fruit of its leading-edge development. In the area of brake control system, the electro-hydraulic brake system (EHB), the electro-mechanical brake system (EMB) and integrated brake system (IBS) have been developed and implemented in production vehicles with various forms of configuration. Due to elimination of mechanical linkages between components of a traditional brake system, the by-wire brake control system has advantages of more flexible control, simpler configuration, shorter response time, better braking performance, easier maintenance, and so forth, thus becomes a better candidate for implementing the active cruise control (ACC), active collision avoidance and regenerative braking control systems.

In pressure-increase phase of an electro-hydraulic brake system (EHB), the switching valve connected to piston cylinder is first closed, followed by opening of the wheel cylinder inlet valves. Brake fluid flows into the wheel cylinder via the inlet valves from a pressure chamber of the piston cylinder through hydraulic circuit. In pressure-reduction phase, inlet valves are closed, and outlet valves are open. Brake fluid flows from wheel cylinder back to the reservoir. In pressure-retention phase, both inlet valves and outlet valves are closed. While there is fault detected in hydraulic circuit, the switching valve is maintained at an open state so as to facilitate brake fluid to flow from piston cylinder to wheel cylinder via the switching valve and inlet valve. In EHB system, the energy for brake actuation is provided by the pressure storage chamber, and it has advantage of fast response. However, the system requires a more sophisticated hydraulic circuit and more number of electromagnetic valves.

In an electro-mechanical brake system (EMB), vehicle braking is realized via brake caliper clamping on brake discs, which is caused by a motion of controlled motor rotation, which is transferred to the clamping action, based on a brake pedal signal. Such system has advantages of fast response, easier control implementation and feasibility for by-wire implementation. However, it is more difficult to implement back-up functionality under a system failure condition.

SUMMARY

It is the objective of the present invention to provide a brake-by-wire system and methods for its operation based on a dual-motor configuration. The brake system therefore may be operated using by-wire operation as well as manual backup braking. It has advantages of fast response, high efficiency of road adhesion utilization, good brake-pedal feel and effective fail-safe operation.

The present invention discloses a brake-by-wire system based on a dual-motor configuration. The system includes a brake pedal, a brake-pedal position sensor, an isolation valve, electric motors, ball-screw sets, a first main cylinder, a second main cylinder, pressure transducers, a brake pedal force emulator, an emulator electromagnetic valve, a manual cylinder with two chambers cascaded in series forming one front chamber and one rear chamber, wheel cylinders. The main cylinder includes piston, pushrod, piston return spring and cylinder body. The manual cylinder includes pushrod, piston, return spring and cylinder body. The brake pedal force emulator includes piston, spring and emulator body.

The brake pedal is connected to the pushrod of the manual cylinder piston via a retention pin. Each of the two chambers of the manual cylinder is connected with one of the two front wheel cylinders via a normally-open electromagnetic valve. In addition, the front chamber of the manual cylinder is connected to the brake pedal force emulator via a normally-closed emulator electromagnetic valve. Each of the electric motors is connected to a respective motion converter that converts an input of rotational motion of the electric motor to an output of linear motion. The piston of the respective piston cylinder is connected to the output end of the motion converter to move in a linear manner. The motion converter may be a ball-screw set.

A brake-fluid reservoir is in fluid communication with the front and rear chambers of the manual cylinder via respective compensation orifices. Each working chamber of the first and second main cylinders, of which the volume is defined by the respective piston cylinder-bottom position, is in fluid communication with the hydraulic control unit (HCU) via brake lines. The hydraulic control unit may include four 2/2 normally-closed electromagnetic valves, four 2/2 normally-open electromagnetic valves. The HCU may further include additional two 2/2 normally-open electromagnetic valves. The hydraulic control unit and the four wheel cylinders are in fluid communication via brake lines so as to perform braking action and brake-pressure regulation on the wheel cylinders.

The electronic control unit is in electrical connection with the brake-pedal position sensor, the pressure transducers of the first and second main cylinders and CAN networks and other signal transducers such as wheel speed transducers not depicted in drawings, and receives signals from the sensor and signal transducers. Further, the emulator electromagnetic valve, the isolation electromagnetic valve and the electric motors are in electrical connection with the electronic control unit and receive control signals from the electronic control unit.

During a braking process, the electronic control unit quickly determines the required wheel cylinder pressure for the attending circumstances based on information including measurement of wheel angular speeds and estimation of vehicle speed, wheel slip ratios, and tire-road adhesion coefficient. The electronic control unit also determines a proper operation mode to provide the required wheel cylinder pressure. As a result, the utilization of the tire-road adhesion is maximized, and the directional stability of the vehicle during braking is secured.

Advantageously, the present invention can realize a maximal utilization of tire-road adhesion based on the functionality of the dual-motor configuration coupled with use of adaptive operation method implemented in by-wire control of vehicle braking, thus resulting in rapid matching of wheel cylinder pressure with the tire-road adhesion;

Advantageously, the present invention provides good brake-pedal feel to driver via a brake-pedal force emulator when vehicle braking is operated in brake-by-wire mode;

Advantageously, the present invention provides high degree of system failure protection as manual braking operation is available as backup when system failure occurs;

Advantageously, the present invention maintains a higher degree of braking function when one of the two motors or main-cylinders may fail as the two sets of motors and main-cylinders serve as backup for each other;

Advantageously, the present invention provides fast response and high accuracy of brake pressure control via electric motor torque control in conjunction with operation of electromagnetic valves and brake pressure regulation using fluid chamber volume adjustment;

Advantageously, the present invention can provide the best mode of vehicle braking operation based on dynamic characteristics of the electric motor in light of the attending circumstances using by-wire braking with the dual-motor configuration. For electric motors with average dynamic characteristics, vehicle braking control may be performed using independent wheel cylinder pressure regulation at each of the four wheels. For electric motors with sufficiently high dynamic characteristics, vehicle braking control may be performed using multiplexed wheel-cylinder pressure regulation, that is, each of the two motors independently performs pressure regulation in sequence on the respective set of two wheel cylinders. For electric motors with superior dynamic characteristics, vehicle braking control may be performed using multi-channel multiplexing operation with the two motors coordinated to implement wheel-cylinder pressure regulation of the four wheels in sequence.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
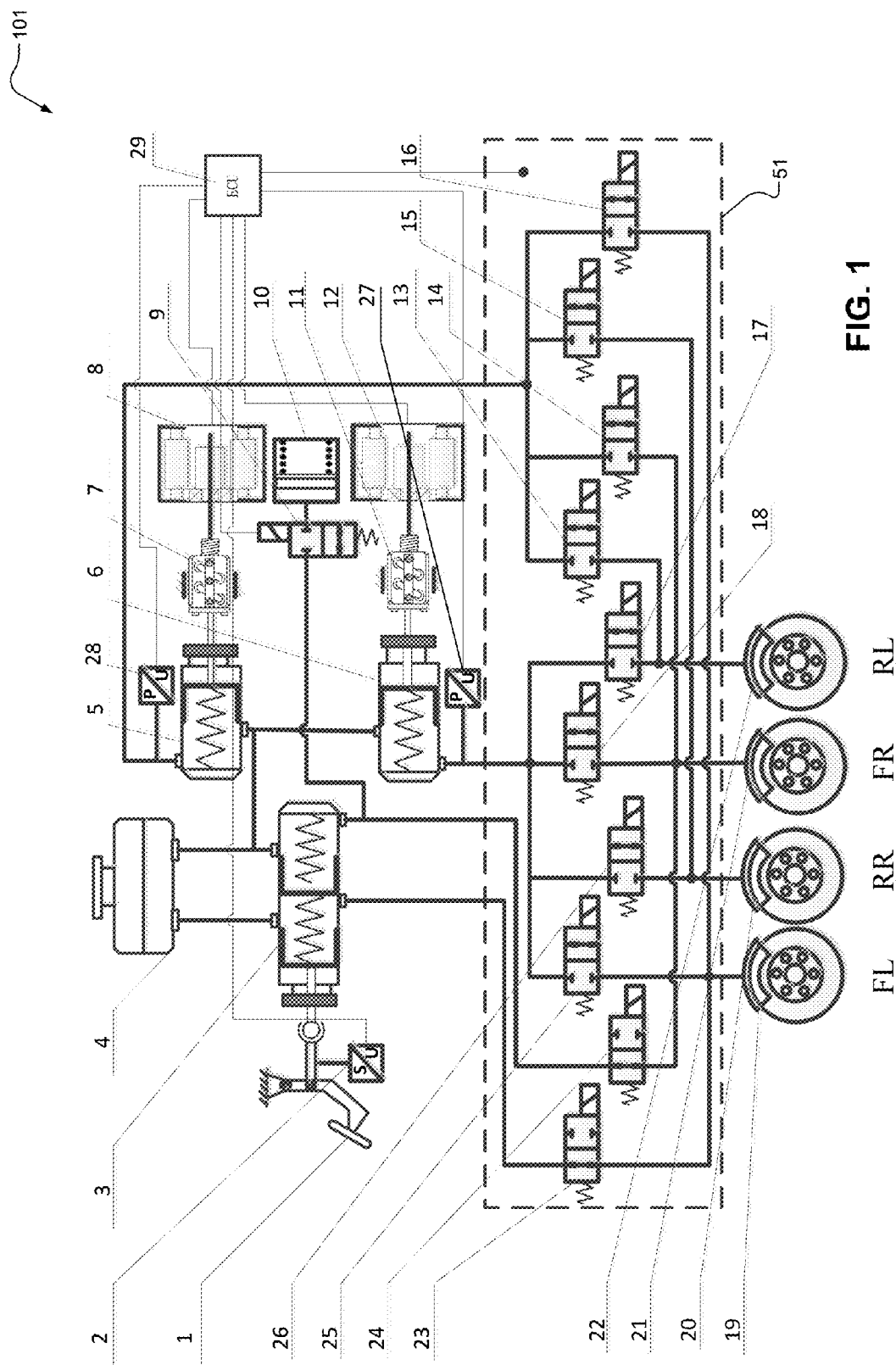
FIG. 1 is a plan view of system diagram depicting the configuration of a brake-by-wire system embodiment based on a dual-motor configuration according to the present invention.

The following description is merely exemplary in nature and is in no way intended to limit the disclosure, its application, or uses. For purposes of clarity, the same reference numbers with or without a single or multiple prime symbols appended thereto will be used in the drawings to identify similar elements.

Referring now to FIG. 1, a brake-by-wire system based on a dual-motor configuration 101 is shown. The system may include a brake pedal 1, a brake-pedal position sensor 2, a manual brake cylinder 3, a brake fluid reservoir 4, a second piston cylinder 5, a first piston cylinder 6, a second ball-screw set 7, a second electric motor 8, a 2/2 normally closed electromagnetic valve (2/2 N.C. valve) 9, a brake-pedal force emulator 10, a first ball-screw set 11, a first electric motor 12, a first piston cylinder pressure sensor 27 and a second piston cylinder pressure sensor 28.

The brake-by-wire system 101 may also include a hydraulic control unit 51 in hydraulic communication with the manual brake cylinder 3, the first piston cylinder 6 and the second piston cylinder 5. The hydraulic control unit 51 may include a 2/2 N.C. valve 13, a 2/2 N.C. valve 14, a 2/2 N.C. valve 15, a 2/2 N.C. valve 16, a 2/2 N.C. valve 17, a 2/2 N.C. valve 18, a 2/2 normally open electromagnetic valve (2/2 N.O. valve) 23, a 2/2 N.O. valve 24, a 2/2 N.C. valve 25, and a 2/2 N.C. valve 26.

The hydraulic control unit 51 may be in fluid communication with a first wheel cylinder 19, a second wheel cylinder 20, a third wheel cylinder 21 and a fourth wheel cylinder 22.

The brake pedal 1 may be connected with the manual brake cylinder 3 at the pushrod of the brake cylinder 3 via a connecting pin. The brake fluid reservoir 4 may be in fluid communication with the manual brake cylinder 3 at the front and rear chambers of the manual brake cylinder 3 via compensation orifices. The front chamber outlet port of the manual brake cylinder 3 may be in fluid communication with an inlet port of the third wheel cylinder 21 via the 2/2 N.O. valve 24. The rear chamber outlet port of the manual brake cylinder 3 may be in fluid communication with an inlet port of the first wheel cylinder 19 via the 2/2 N.O. valve 23.

The first electric motor 12 may be connected to the ball screw of the first ball-screw set 11 via a connecting key. The nut of the first ball-screw set 11 may be connected to the piston of the first piston cylinder 6 via a pushrod. The second electric motor 8 may be connected to the ball screw of the second ball-screw set 7 via a connecting key. The nut of the second ball-screw set 7 may be connected to the piston of the second piston cylinder 5 via a pushrod.

An outlet port of the first piston cylinder 6 may be in fluid communication with the 2/2 N.C. valve 17, the 2/2 N.C. valve 18, the 2/2 N.C. valve 25, the 2/2 N.C. valve 26 and the first piston cylinder pressure sensor 27 via hydraulic brake lines. An outlet port of the second piston cylinder 5 may be in fluid communication with the 2/2 N.C. valve 13, 2/2 N.C. valve 14, 2/2 N.C. valve 15, 2/2 N.C. valve 16 and the second piston cylinder pressure sensor 28 via hydraulic brake lines, The first wheel cylinder 19 may be in fluid communication with the 2/2 N.O. valve 23, the 2/2 N.C. valve 25 and the 2/2 N.C. valve 16. The second wheel cylinder 20 may be in fluid communication with the 2/2 N.C. valve 26 and the 2/2 N.C. valve 15. The third wheel cylinder 21 may be in fluid communication with the 2/2 N.O. valve 24, the 2/2 N.C. valve 18 and the 2/2 N.C. valve 14. The fourth wheel cylinder 22 may be in fluid communication with the 2/2 N.C. valve 17 and the 2/2 N.C. valve 13.

The brake-by-wire system 101 may include an electronic control unit (ECU) 29. The brake-pedal position sensor 2 may be installed on the brake pedal 1. An output terminal of the brake-pedal position sensor 2 may be electrically connected to the ECU 29, and a brake-pedal position signal collected by the brake-pedal position sensor 2 may be sent to the ECU 29. The ECU 29 also receives signals from the first piston cylinder pressure sensor 27, the second piston cylinder pressure sensor 28 and signals of other transducers such as rotational signals and CAN network (not shown) signals. The ECU 29 may also send control command signals to each of the electric motors and electromagnetic valves.

The ECU 29 performs control computation and decision making to quickly determine the required brake pressure of each wheel cylinder in response to the attending circumstances of the tire-road adhesion. The ECU may determine the brake pressure based on measured value of wheel angular speeds as well as estimation of vehicle speed, wheel slip ratios, and tire-road adhesion coefficient during a braking maneuver. The ECU 29 determines the most appropriate operation mode for the braking conditions so as to maximize the utilization of the tire-road adhesion, thus providing the best directional stability of the vehicle during a braking maneuver.

Figure 2:
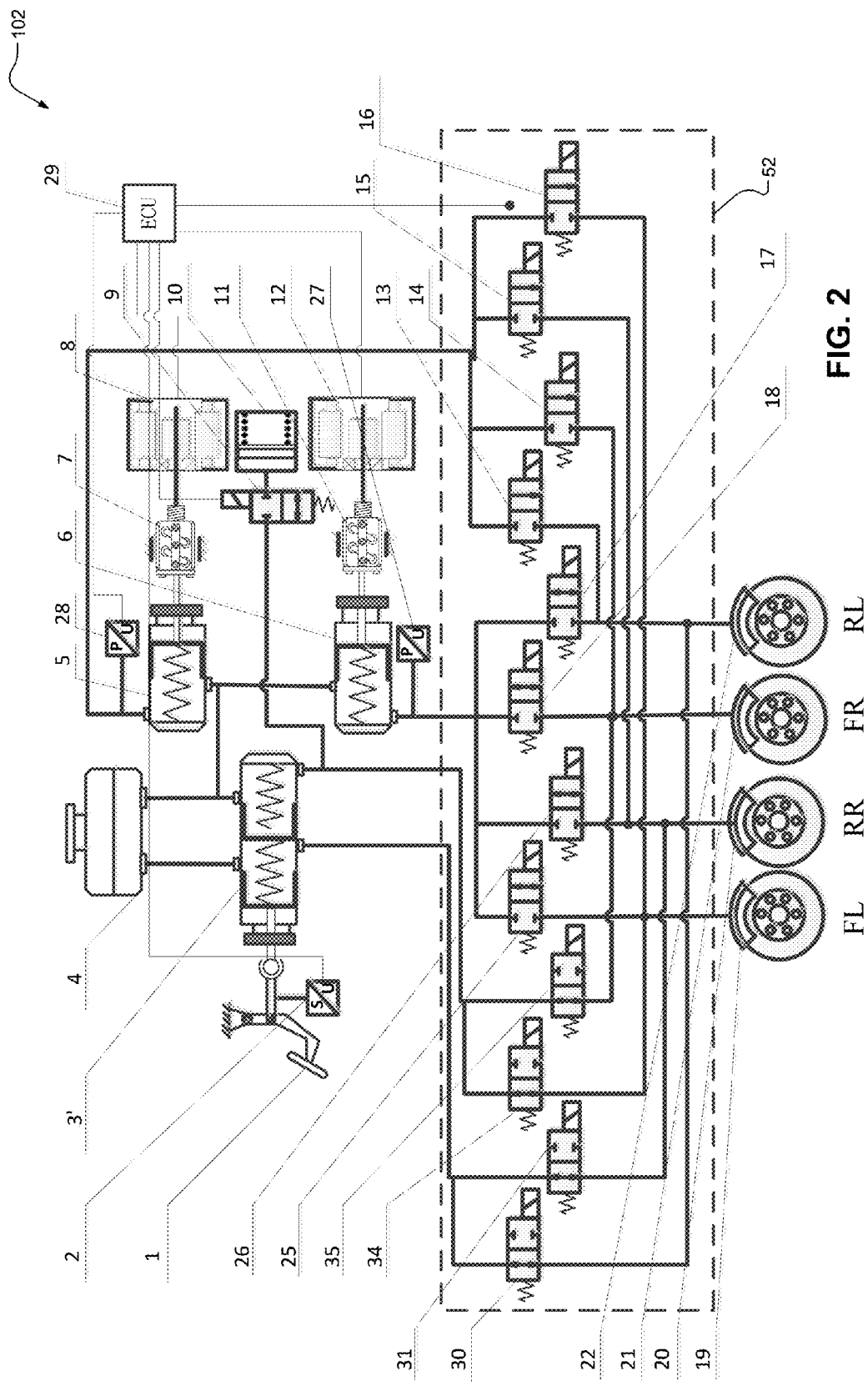
FIG. 2 is a plan view of system diagram depicting the configuration of another brake-by-wire system embodiment based on a dual-motor configuration according to the present invention.

Referring now to FIG. 2, another brake-by-wire system 102 is shown. The system 102 is similar to the system 101 except for a different brake system architecture. In the system 102, the front chamber of the manual brake cylinder 3' is hydraulically connected to the two front wheel cylinders 19 and 21, and the rear chamber of the manual brake cylinder 3' is hydraulically connected to the two rear wheel cylinders 20 and 22.

Figure 3:
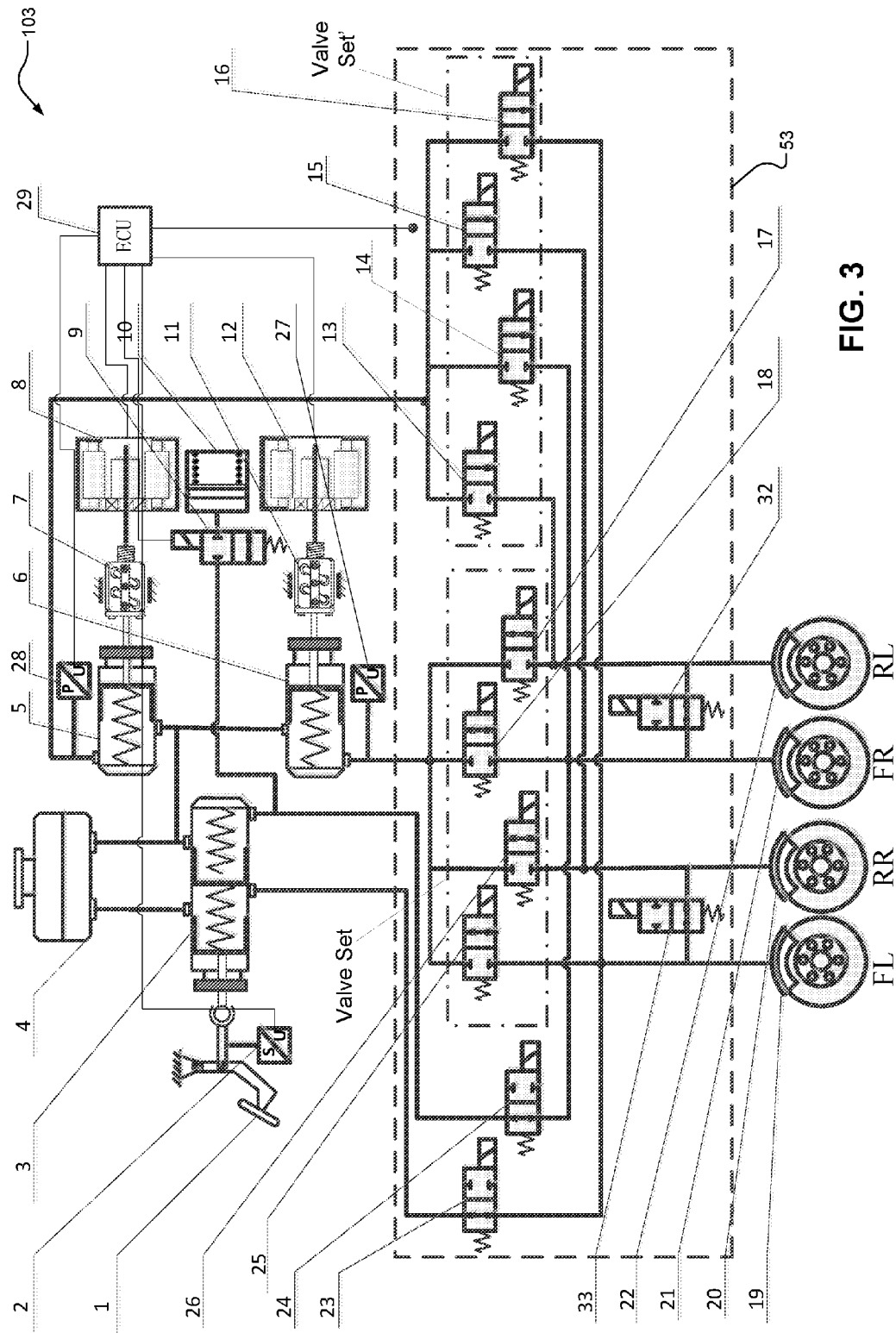
FIG. 3 is a plan view of system diagram depicting the configuration of yet another brake-by-wire system embodiment based on a dual-motor configuration according to the present invention.

Referring now to FIG. 3, yet another brake-by-wire system 103 is shown. The brake-by-wire system 103 includes substantially all the elements of those included in the brake-by-wire system 101, with two additional electromagnetic valves for better implementation of front-rear brake proportioning. In the brake-by-wire system 103, the wheel cylinder 19 of front-left wheel is in fluid communication with the wheel cylinder 20 of rear-right wheel via a 2/2 N.O. valve 33, and the wheel cylinder 21 of front-right wheel is in fluid communication with the wheel cylinder 22 of rear-left wheel via a 2/2 N.O. valve 32. The cross hydraulic connection of the front-left to the rear-right and the front-right to the rear-left brakes constitutes an H-type brake system configuration.

Figure 4:
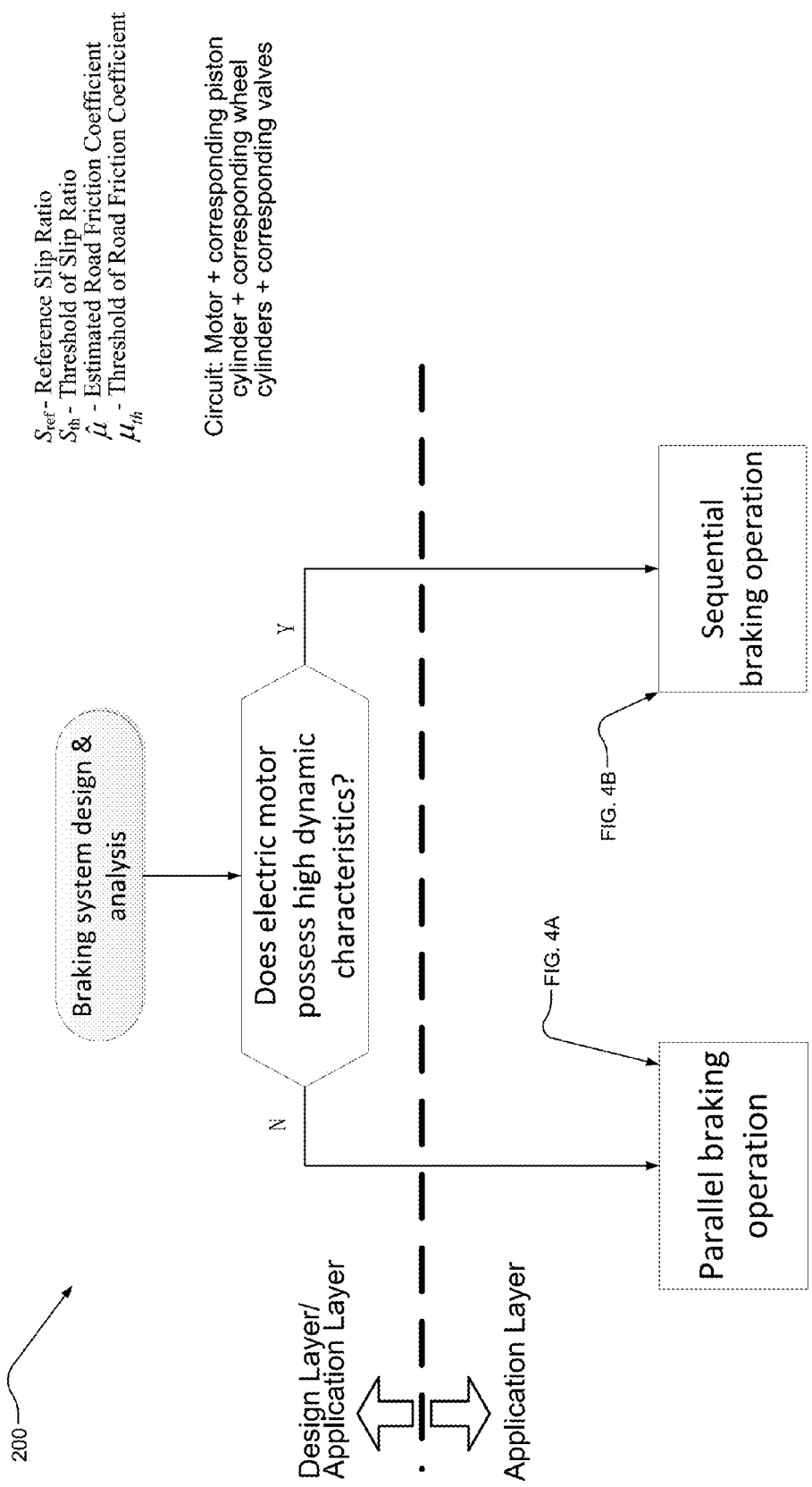
FIG. 4 is a flow diagram of a method of system operation of the brake-by-wire system according to the present invention.
Figure 4A:
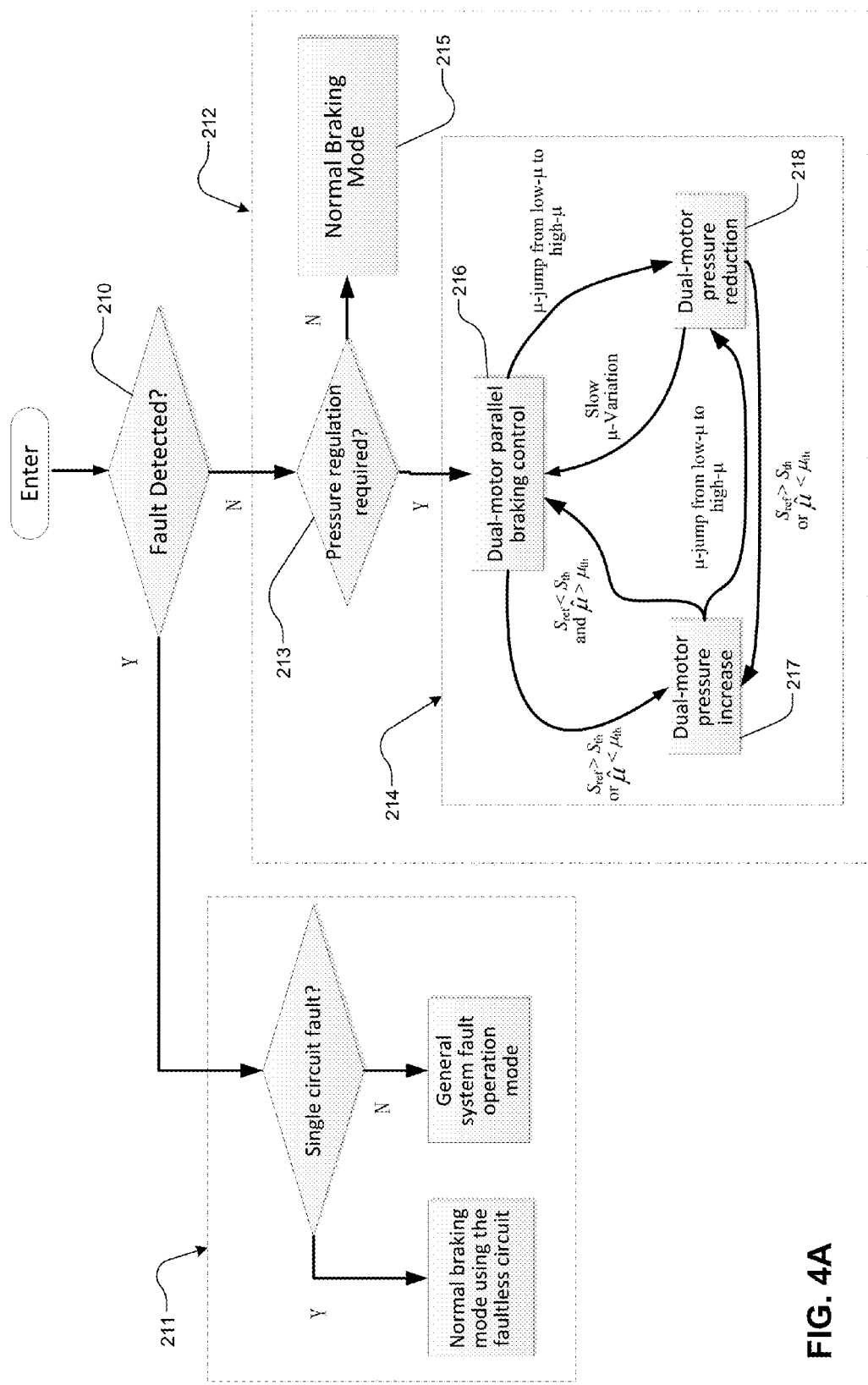
FIG. 4A is a flow diagram of a method of parallel braking operation of the brake-by-wire system according to the present invention.
Figure 4B:
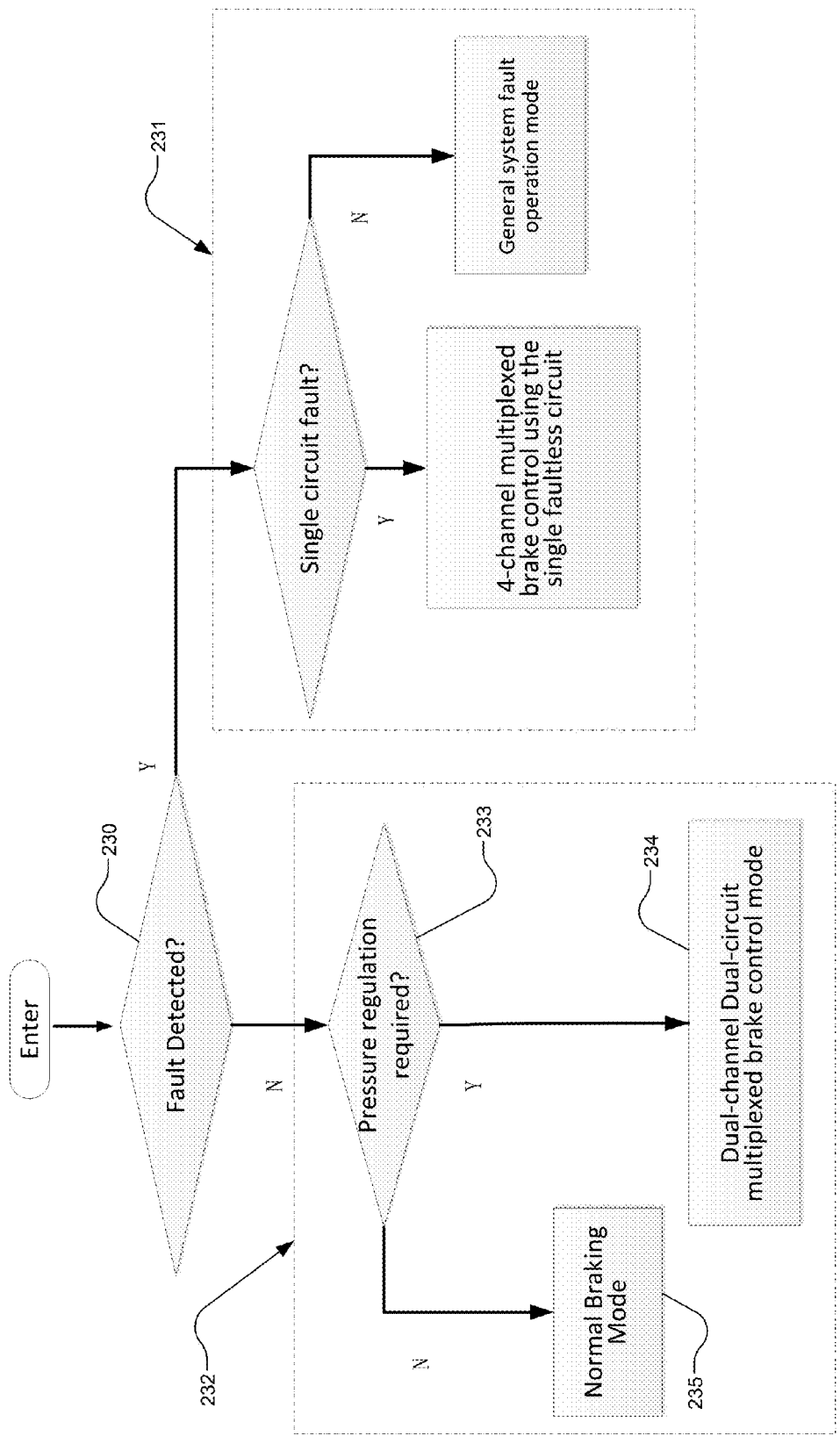
FIG. 4B is a flow diagram of a method of sequential braking operation of the brake-by-wire system according to the present invention.

Referring now to FIG. 4, flow diagram of a method 200 of designing and operating the brake-by-wire system according to the present invention is shown. The braking operation of the system may include eight modes, namely, normal braking operation mode (Mode I), dual-motor pressure decrease mode (Mode II), dual-motor pressure increase mode (Mode III), dual-motor parallel brake control mode (Mode IV), dual-circuit dual-channel multiplexed braking mode (Mode V), normal braking mode utilizing faultless single circuit (Mode VI), four-channel multiplexed braking operation utilizing faultless single circuit (Mode VII) and failure-protection mode (Mode VIII).

The method 200 includes determining a system operation protocol during the design stage of the system. The system operation protocol may include a parallel operation mode and a sequential operation mode. The method 200 determines which mode of the system operation protocol to be used based on a performance status of dynamic characteristics of the electric motors. The determination of the performance status may be based on a priori analysis of motor design parameters during the design stage prior to the motor put into brake control operation. The determination of the performance status may also be based on real-time system data obtained during operation of the brake control system.

During the system application phase, for each mode of the system operation protocol, the method 200 determines the operation of the electric motors and electromagnetic valves based on situation of braking maneuver and system failure status.

Also referring to FIG. 1, for purpose of illustration, when the brake system is under the parallel operation mode, the method 200 may determine in step 210 whether there is a system failure via operation of the ECU 29. If the ECU 29 detects a system failure, the method 200 goes to step 211 to operate a system failure protection mode; otherwise, the method 200 goes to step 212 to operate a normal system operation mode.

Also referring to FIG. 1, for purpose of illustration, when the brake system is under the sequential operation mode, the method 200 may determine in step 230 whether there is a system failure via operation of the ECU 29. If the ECU 29 detects a system failure, the method 200 goes to step 231 to operate a system failure protection mode; otherwise, the method 200 goes to step 232 to operate a normal system operation mode.

During the parallel operation mode, the method 200 may execute step 213 to determine whether there is a need for brake pressure regulation. Brake pressure regulation during a brake maneuver may be needed in situations such as antilock braking condition or vehicle stability control condition. If brake pressure regulation is needed, the method 200 goes to step 214 to operate brake pressure regulation, which may include a step 216 that operates dual-motor parallel braking control, a step 217 that operates dual-motor pressure increase, and a step 218 that operates dual-motor pressure decrease. If brake pressure regulation is not needed, the method 200 goes to step 215 to operate a normal braking mode.

During the sequential operation mode, the method 200 may execute step 233 to determine whether there is a need for brake pressure regulation. If brake pressure regulation is needed, the method 200 may go to step 234 to operate a dual-circuit dual-channel multiplexed braking control. If brake pressure regulation is not needed, the method 200 may go to step 235 to operate a normal braking mode.

Figure 5:
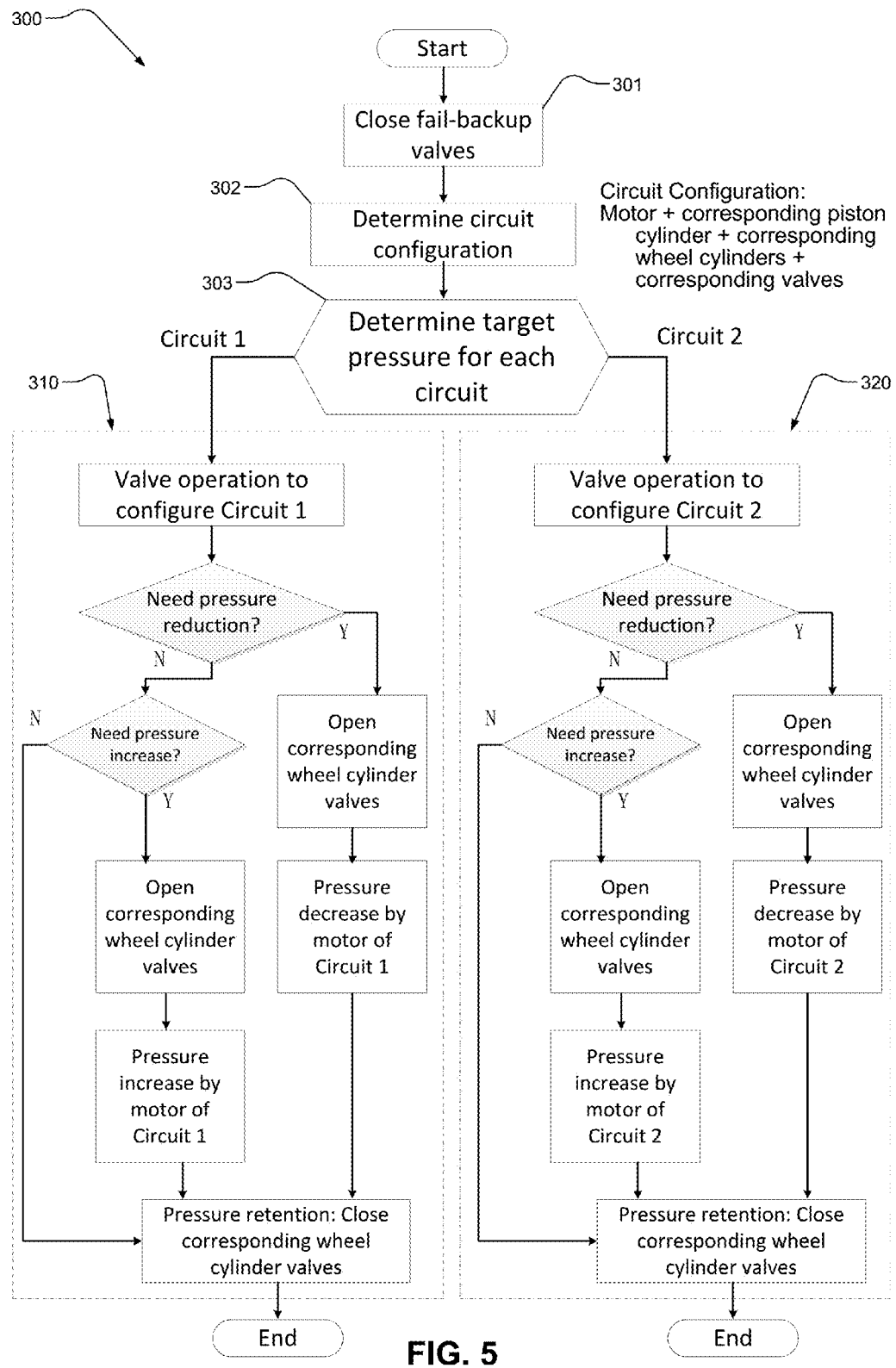
FIG. 5 is a flow diagram of normal braking operation Mode I of the brake-by-wire system according to the present invention.

Referring now to FIG. 5, flow diagram of an exemplary method 300 of normal braking operation mode (Mode I) is shown. The method 300 may be used in conjunction with the brake-by-wire system with two motors and two piston cylinders. Each motor and the respective piston cylinder may be used to operate a respective hydraulic circuit. The method 300 may include a step 302 that determines vehicle brake system configuration via association of one wheel cylinder pressure control with the other to define the hydraulic circuits. For example, the front-left and front-right wheel cylinders may be operated as one group, and the rear-left and rear-right wheel cylinders may be operated as another group. Alternatively, the front-left and right-rear wheel cylinders may be operated as one group, and the front-right and rear-left wheel cylinders may be operated as another group.

Referring also to FIG. 3, an H-type brake system configuration is used to achieve an ideal brake pressure proportioning. The method 300 may include a step 303 that determines brake pressure command for each hydraulic circuit. The method 300 may include a step 310 and a step 320 that performs pressure regulation of the two hydraulic circuits, of which the configuration is determined in step 302, respectively. In one embodiment where parallel braking operation protocol is used, the two steps 310 and 320 may be performed simultaneously. In another embodiment where sequential braking operation protocol is used, the two steps 310 and 320 may be performed in sequence, one after the other.

Referring also to FIG. 3, the step 302 may determine to use the first electric motor and the first piston cylinder to form a first hydraulic circuit (HC-1). The step 310 may perform pressure regulation of the HC-1 by regulating the output torque of the first electric motor 12 to control the pressure of the first piston cylinder 6 when the corresponding wheel cylinder pressure may need to be increased or decreased. The step 310 also opens the corresponding electromagnetic valves to facilitate the flow of brake fluid so the piston cylinder pressure can reach the wheel cylinders. When there is a need to retain wheel cylinder pressure, the step 310 may close the corresponding electromagnetic valves of the wheel cylinder.

Figure 6:
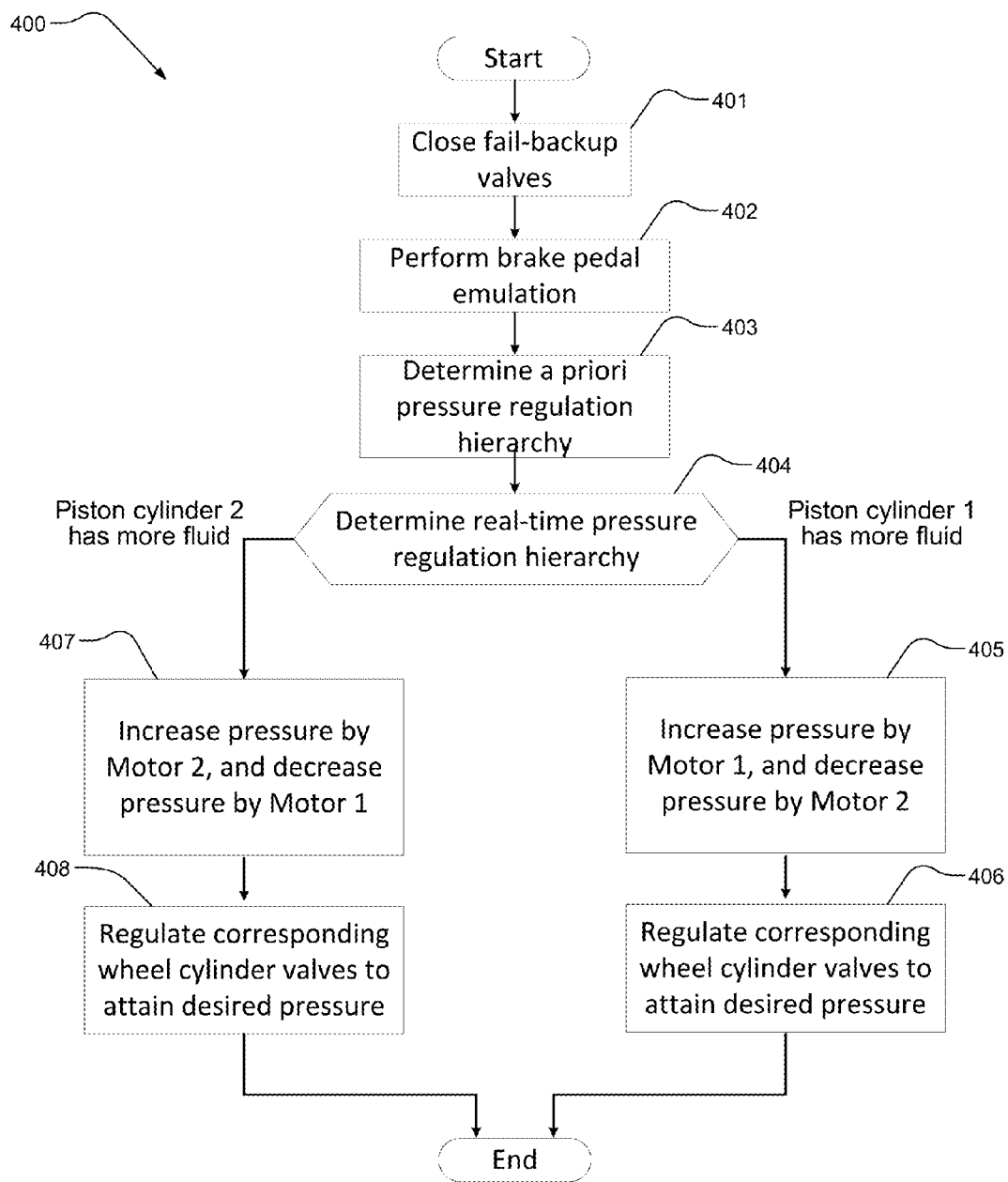
FIG. 6 is a flow diagram of dual-motor parallel braking operation Mode IV of the brake-by-wire system according to the present invention.

Referring now to FIG. 6, flow diagram of a method 400 of dual-motor parallel braking operation mode (Mode IV) is shown. The method 400 may include a step 401 that closes fail-backup electromagnetic valves, a step 402 that performs brake-pedal emulation. The method 400 may also include a step 403 that determines a pressure-regulation hierarchy.

Also referring to FIG. 1, the step 401 may close the fail-backup 2/2 N.O. valves 23, 14. The step 402 may open the 2/2 N.C. valve 9 so the brake fluid in the manual brake cylinder 3 may flow into the brake pedal force emulator 10 via the 2/2 N.C. valve 9.

At the initial control cycle of the parallel braking operation mode, the method 400 may perform a step 403 that determines an a priori pressure-regulation regulation hierarchy based on a system default setting. The pressure-regulation hierarchy may be of 1-over-2 or of 2-over-1. When the pressure-regulation hierarchy is of 1-over-2, the first piston cylinder is used primarily for a higher-pressure regulation and the second piston cylinder is used primarily for a lower-pressure regulation. When the pressure-regulation hierarchy is of 2-over-1, the second piston cylinder is used primarily for a higher-pressure regulation and the first piston cylinder is used primarily for a lower-pressure regulation.

The method 400 may include a step 404 that determines the pressure-regulation hierarchy in real time during the dual-motor parallel braking operation based on the brake fluid volume in the hydraulic chamber of the piston cylinder. The brake fluid volume may be determined based on the angular position of the electric motor, or the linear position of the piston. The step 404 may compare the angular position of the first electric motor 12 and the angular position of the second motor 8. Based on the angular position of the motor relative to a potential of piston cylinder stroke, the step 404 may determine the potential amount of pressure increase of the piston cylinder actuated by the respective electric motor. When the potential amount of the pressure increase of the first electric motor 12 is greater than the potential amount of the pressure increase of the second electric motor 8, the step 404 determines the pressure-regulation hierarchy to be of 1-over-2; otherwise, the step 404 determines the pressure-regulation hierarchy to be of 2-over-1.

Based on the determined pressure-regulation hierarchy the method 400 goes to a corresponding step 405 or step 407 to perform respective pressure regulation. In step 405 the first electric motor 12 applies pressure to the piston cylinder 6 to increase pressure in the piston cylinder 6, and the second electric motor 8 reduces pressure to the piston cylinder 5 to decrease pressure in the piston cylinder 5. In step 407 the first electric motor 12 reduces pressure to the piston cylinder 6 to decrease pressure in the piston cylinder 6, and the second electric motor 8 applies pressure to the piston cylinder 5 to increase pressure in the piston cylinder 5.

The method 400 may include a step 406 to be performed after step 405 to operate corresponding electromagnetic valves to achieve the desired pressure for the hydraulic circuit. The method 400 may also include a step 408 to be performed after step 407 to operate corresponding electromagnetic valves to achieve the desired pressure for the hydraulic circuit. In step 405 and step 407, the decision for the electromagnetic valves operation is based on specific wheel cylinder pressure requirement, as well as the status of pressure-increase or pressure-decrease of the two piston cylinders.

Figure 7:
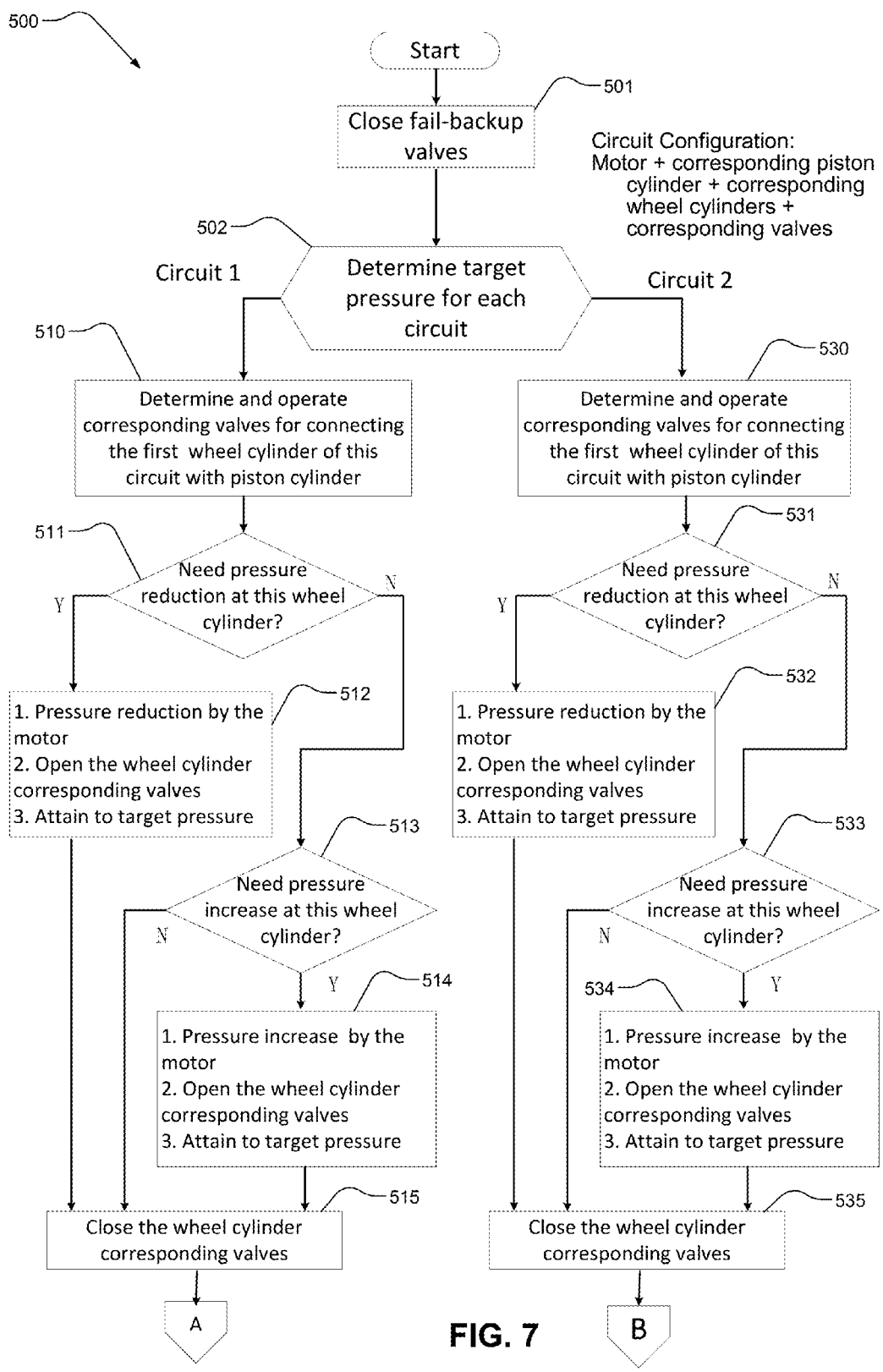
FIG. 7 is a flow diagram of dual-circuit dual channel multiplexed braking operation Mode V of the brake-by-wire system according to the present invention.
Figure 7:
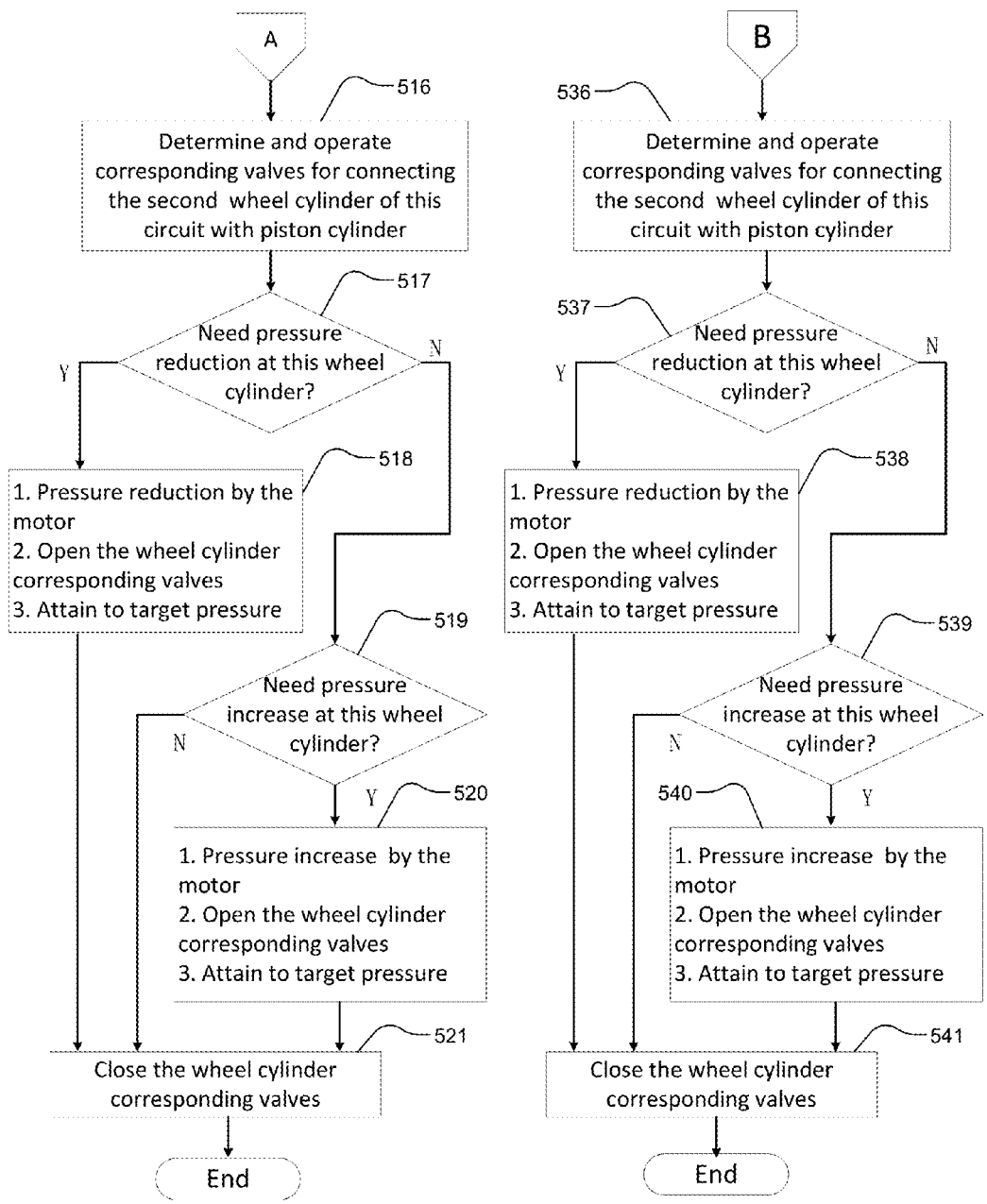

Referring now to FIG. 7, flow diagram of a method 500 of dual-dual-circuit dual-channel multiplexed braking operation mode (Mode V) is shown. The method 500 may include a step 502 that determines the brake system configuration by forming two brake circuits via control operation of corresponding electromagnetic valves. Each circuit may include an electric motor, a piston cylinder, two 2/2 N.C. valves and two wheel cylinders, all components in one circuits are exclusive from the other circuit. Each circuit is operated independently of the other circuit, using multiplexed hydraulic control on the respective two wheel cylinders.

The method 500 operates on each channel in a multiplexed manner. For example, the method may perform step 510 through step 515 for one channel of a circuit, followed by performing step 516 through step 521 for another channel of the same circuit. At the same time, the method 500 may perform step 530 through step 535 for one channel of another circuit, followed by performing step 536 through step 541 for another channel of the same circuit.

Referring also to FIG. 1, during each control cycle, when any one or both of the two channels, for example, wheel cylinder 19 and wheel cylinder 20, may have a need of pressure reduction, the method 500 may operate to reduce pressure in the first piston cylinder 6 via control of the first electric motor 12, and, simultaneously, open corresponding electromagnetic valves for pressure reduction in the respective wheel cylinder, and close other electromagnetic valves in the same circuit until pressure reduction reaches the target, as exemplified by operation depicted in step 511 and step 512.

Conversely, when any one or both of the two channels may have a need of pressure increase, the method 500 may operate to apply pressure in the first piston cylinder 6 via control of the first electric motor 12, and, simultaneously, open corresponding electromagnetic valves for pressure increase in the respective wheel cylinder, and close other electromagnetic valves in the same circuit until pressure increase reaches the target, as exemplified by operation depicted in step 511 and step 512.

When both channels requires pressure retention, the method 500 may perform a step 522 that maintains pressure at, for example, the first piston cylinder 6 via operation of the first electric motor 12, and close all electromagnetic valves in the corresponding circuit. The method 500 may also perform a step 542 that maintains pressure at, for example, the second piston cylinder 5 via operation of the second electric motor 8, and closes all electromagnetic valves in the corresponding circuit.

Figure 8:
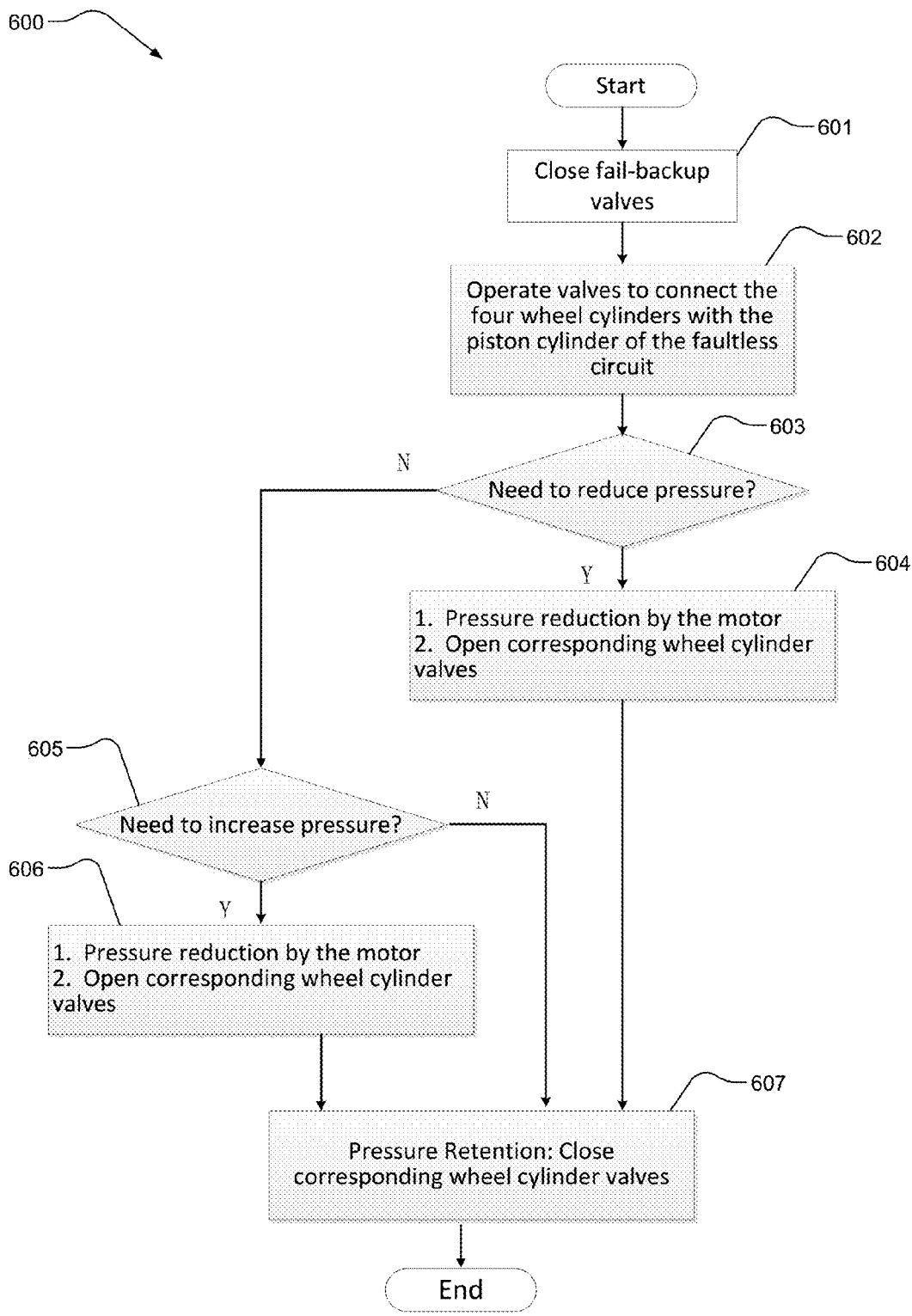
FIG. 8 is a flow diagram of normal braking operation using faultless single circuit Mode VI of the brake-by-wire system according to the present invention.
Figure 9:
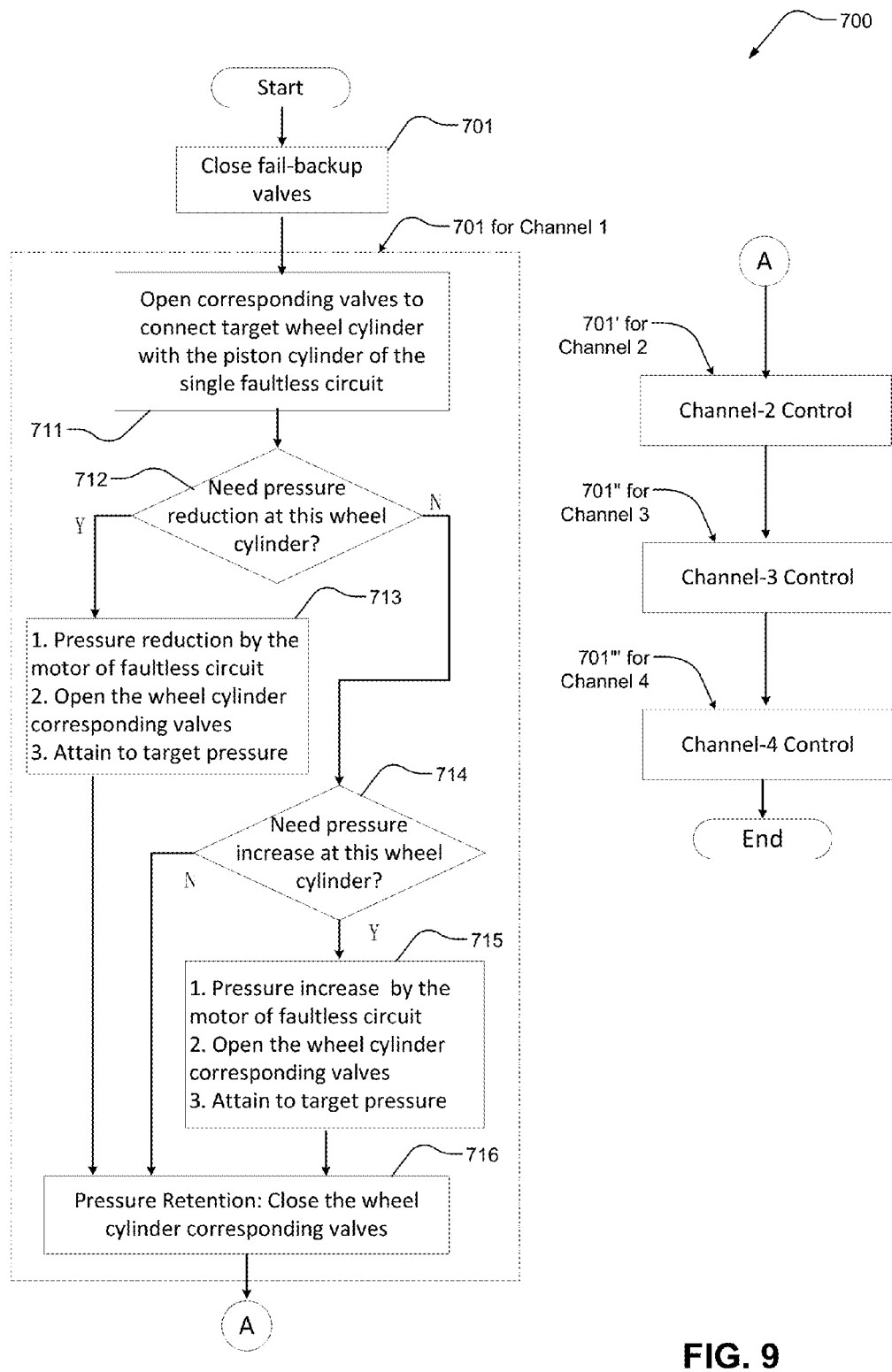
FIG. 9 is a flow diagram of four-channel multiplexed braking operation using faultless single circuit Mode VII of the brake-by-wire system according to the present invention.

Referring now to FIG. 8, flow diagram of a method 600 of normal braking operation using faultless single circuit (Mode VI) is shown. The method 600 may include a step 602 that operates corresponding electromagnetic valves to make hydraulic connections between all the four wheel cylinders with the piston cylinder of the faultless circuit. When there is a need for pressure reduction, the method 600 may perform a step 604 to open wheel cylinder valves and operate the electric motor for pressure reduction. When there is a need for pressure increase, the method 600 may perform a step 606 to open wheel cylinder valves and operate the electric motor for pressure increase. The method 600 may perform a step 607 to close all wheel cylinder valves for pressure retention.

Referring now to FIG. 8, flow diagram of a method 700 of four-channel multiplexed braking operation using faultless single circuit (Mode VII) is shown. The method 700 includes a step 710 that performs pressure regulation on a target wheel cylinder, and subsequently perform the step in a similar manner for other wheel cylinders as exemplified by step 710', step 710" and step 710'".

The step 710 may include a step 711 to open a corresponding electromagnetic valve of the target wheel cylinder to make hydraulic connection between the target wheel cylinder and the piston cylinder of the faultless circuit. The step 710 may perform pressure reduction for the target wheel cylinder by performing step 713. The step 710 may also perform pressure increase for the target wheel cylinder by performing step 715. At each control cycle after performing pressure increase or decrease the step 710 performs a step 716 that closes the corresponding electromagnetic valve of the target wheel cylinder for pressure retention.

The step 713 may include torque reduction of the electric motor, monitoring piston cylinder pressure and closing corresponding valve of the target wheel cylinder when the piston cylinder pressure reaches the desired pressure level. The step 715 may include torque increase of the electric motor, monitoring piston cylinder pressure and closing corresponding valve of the target wheel cylinder when the piston cylinder pressure reaches the desired pressure level.

Figure 10:
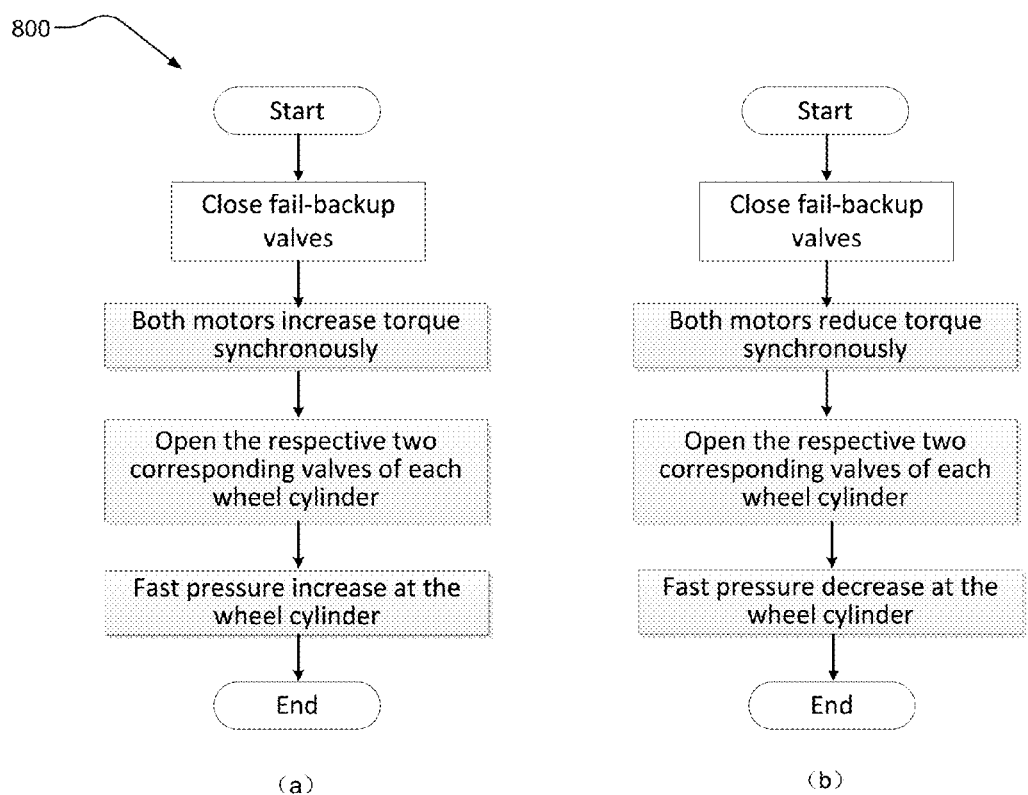
FIG. 10 depicts flow diagrams of pressure increase and pressure decrease of the dual motor braking operation modes II and III according to the present invention.

Referring now to FIG. 10, flow diagram of a method 800 of pressure increase and pressure decrease using dual motor braking operation modes II and III is shown. The method 800 provides a faster pressure regulation according to the present invention.

Referring also to FIG. 4 of a brake-by-wire control system operation method, when vehicle wheel enters an impending wheel lock condition during a braking maneuver, the system performs antilock braking (ABS). During an ABS operation, the wheel cylinder pressure needs to be regulated in a rapid manner. As the system requires a fast pressure increase, the first electric motor 12 and the second electric motor 8 may be increased simultaneously while, at the same time, open the two electromagnetic valves connected at the wheel cylinder, thus increasing the cross-sectional area for fluid flow between the piston cylinder and the wheel cylinder. As a result, dynamic response for pressure regulation is enhanced. Likewise, when there is a need for rapid pressure reduction, torque of the first electric motor 12 and the second electric motor 8 can be reduced simultaneously while, at the same time, open the two valves connected to the wheel cylinder.

Figure 11:
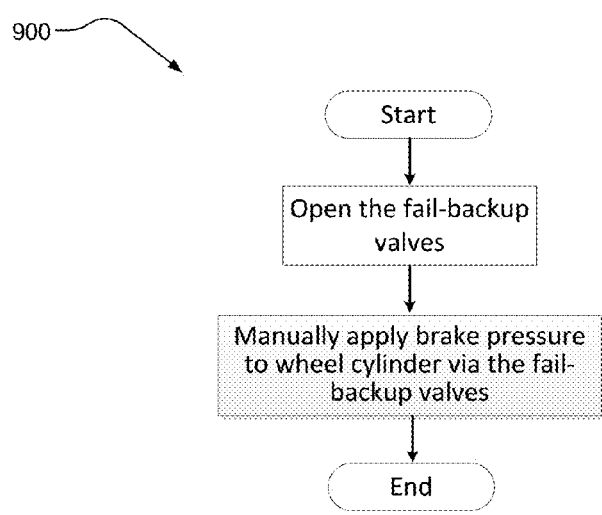
FIG. 11 is flow diagram of braking system failure operation Mode VIII of the brake-by-wire system according to the present invention.

Referring now to FIG. 11, a method 900 of braking system failure operation (Mode VIII) is shown. The method 900 provides a system operation process when there is a system failure of the brake-by-wire system according to the present invention.

Referring also to FIG. 4, when there is a system failure of the brake-by-wire control system, due to the fact that the failure-backup electromagnetic valves 23, 24 are 2/2 normally open valves, these valves will be open even when there is an electric power system failure of the vehicle. Therefore, driver may operate the brake by depressing the brake pedal, pressurized brake fluid may then flow into wheel cylinders via the 2/2 N.O. valves 23, 24 from the manual brake cylinder 3 to carry out vehicle braking performance.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:
1. A brake control system of a vehicle comprising:
a first electric motor, a second electric motor, a first piston cylinder comprising a first hydraulic chamber and a first piston, where the position of the first piston defines the volume of the first hydraulic chamber, a second piston cylinder comprising a second hydraulic chamber and a second piston, where the position of the second piston defines the volume of the second hydraulic chamber, a plurality of wheel cylinders, and a hydraulic control unit (HCU) comprising a first set of electromagnetic valves and a second set of electromagnetic valves; wherein the first electric motor is mechanically connected to the first piston of the first piston cylinder via a first motion converter that converts rotational motion of the first electric motor to linear motion of the first piston, and the second electric motor is mechanically connected to the second piston of the second piston cylinder via a second motion converter that converts rotational motion of the second electric motor to linear motion of the second piston;

all electromagnetic valves in the first set of electromagnetic valves are hydraulically connected in fluid communication with each other, and all electromagnetic valves in the second set of electromagnetic valves are hydraulically connected in fluid communication with each other;

the first hydraulic chamber is hydraulically connected with each of the first set of the electromagnetic valves, and the second hydraulic chamber is hydraulically connected with each of the second set of the electromagnetic valves; and each of the first set of the electromagnetic valves is hydraulically connected with one and only one corresponding wheel cylinder, each of the second set of the electromagnetic valves is hydraulically connected with one and only one corresponding wheel cylinder, and each of the wheel cylinders is hydraulically connected with one and only one of the first set of the electromagnetic valves and also one and only one of the second set of the electromagnetic valves.

2. The brake control system as in claim 1 wherein each one of the first set of the electromagnetic valves is a normally open valve.

3. The brake control system as in claim 2 wherein each one of the second set of the electromagnetic valves is a normally closed valve.

4. A method of operating the brake control system of claim 1 comprising a first electric motor, a second electric motor, a first piston cylinder comprising a first hydraulic chamber and a first piston, where the position of the first piston defines the volume of the first hydraulic chamber, a second piston cylinder comprising a second hydraulic chamber and a second piston, where the position of the second piston defines the volume of the second hydraulic chamber, a plurality of wheel cylinders, and a hydraulic control unit (HCU) comprising a first set of electromagnetic valves and a second set of electromagnetic valves wherein the first electric motor is mechanically connected to the first piston of the first piston cylinder via a first motion converter that converts rotational motion of the first electric motor to linear motion of the first piston, and the second electric motor is mechanically connected to the second piston of the second piston cylinder via a second motion converter that converts rotational motion of the second electric motor to linear motion of the second piston; all electromagnetic valves in the first set of electromagnetic valves are hydraulically connected in fluid communication with each other, and all electromagnetic valves in the second set of electromagnetic valves are hydraulically connected in fluid communication with each other; the first hydraulic chamber is hydraulically connected with each of the first set of the electromagnetic valves, and the second hydraulic chamber is hydraulically connected with each of the second set of the electromagnetic valves; and each of the first set of the electromagnetic valves is hydraulically connected with one and only one corresponding wheel cylinder, each of the second set of the electromagnetic valves is hydraulically connected with one and only one corresponding wheel cylinder, and each of the wheel cylinders is hydraulically connected with one and only one of the first set of the electromagnetic valves and also one and only one of the second set of the electromagnetic valves, said method comprising steps of:

determining a performance status of dynamic characteristics of the electric motors, the performance status being one of HIGH or LOW;

operating the brake control system in a parallel operation mode when the performance status is LOW, wherein the parallel operation mode further comprising steps of:

determining a system fault status, the system fault status being one of Fault or No-Fault; and operating the brake control system in a dual-motor parallel brake control mode when the system fault status is No-Fault; and operating the brake control system in a sequential operation mode when the performance status is HIGH, wherein the sequential operation mode further comprising steps of:

determining the system fault status; and operating the brake control system in a dual-circuit dual-channel multiplexed braking mode when the system fault status is No-Fault.

5. The method of operating the brake control system of claim 4 wherein the dual-motor parallel brake control mode further comprises steps of:

determining a regulation hierarchy based on real-time data of the brake control system, wherein the regulation hierarchy being one of the 1-over-2 or 2-over-1;

operating the first electric motor to increase pressure and operating the second electric motor to decrease pressure when the regulation hierarchy is 1-over-2; and operating the first electric motor to decrease pressure and operating the first electric motor to increase pressure when the regulation hierarchy is 2-over-1.

6. The method of operating the brake control system of claim 5 wherein the step of determining the regulation hierarchy is based on comparison of an angular position of the first electric motor and an angular position of the second electric motor.

7. The method of operating the brake control system of claim 5 wherein the step of determining the regulation hierarchy is based on comparison of a linear position of the piston of the first piston cylinder and a linear position of the piston of the second piston cylinder.

8. The method of operating the brake control system of claim 4 wherein the step of determining the performance status of dynamic characteristics of the electric motors is based on an a priori information before the brake control system is put into operation.

9. The method of operating the brake control system of claim 4 wherein the step of determining the performance status of dynamic characteristics of the electric motors is based on real-time system information obtained during operation of the brake control system.

10. The method of operating the brake control system of claim 4 wherein the dual-circuit dual-channel multiplexed braking mode further comprises steps of:

determining a first target pressure for a first circuit comprising the first piston cylinder and a first wheel cylinder and a second wheel cylinder of the first circuit;

determining and operating a corresponding valve for connecting the first piston cylinder with the first wheel cylinder of the first circuit;

performing pressure regulation for the first wheel cylinder of the first circuit to reach the first target pressure;

determining and operating a corresponding valve for connecting the first piston cylinder with the second wheel cylinder of the first circuit;

performing pressure regulation for the second wheel cylinder of the first circuit to reach the first target pressure;

determining a second target pressure for a second circuit comprising the second piston cylinder and a first wheel cylinder and a second wheel cylinder of the second circuit;

determining and operating a corresponding valve for connecting the second piston cylinder with the first wheel cylinder of the second circuit;

performing pressure regulation for the first wheel cylinder of the second circuit to reach the second target pressure;

determining and operating a corresponding valve for connecting the second piston cylinder with the second wheel cylinder of the second circuit; and performing pressure regulation for the second wheel cylinder of the second circuit to reach the second target pressure.

11. The brake control system as in claim 1 further comprising:

a manual brake cylinder consisting of a first manual chamber and a second manual chamber, each having an outlet port;

a first normally-open electromagnetic valve; and a second normally-open electromagnetic valve; wherein
the first normally-open electromagnetic valve is hydraulically connected with the outlet port of the first manual chamber, and the second normally-open electromagnetic valve is hydraulically connected with the outlet port of the second manual chamber; and the first normally-open electromagnetic valve is hydraulically connected with a subset of the wheel cylinders while the second normally-open electromagnetic valves is hydraulically connected with the wheel cylinders that are not connected with the first normally-open electromagnetic valve.

12. The brake control system as in claim 11 further comprising a brake pedal force emulator.

13. The brake control system as in claim 1 wherein
each one of the first set and the second set of the electromagnetic valves is a normally closed valve.

14. The brake control system as in claim 1 further comprising
a brake pedal sensor; and
an electronic control unit (ECU) electrically connected to the brake pedal sensor, said electromagnetic valves and said electric motors.

* * * * *